Patented July 6, 1943

2,323,759

UNITED STATES PATENT OFFICE 2,323,759

METHOD OF FORMING ARTICLES FROM TITANIUM DIOXIDE

Hans Thurnauer and George Warren Fichter, Chattanooga, Tenn., assignors to American Lava Corporation, Chattanooga, Tenn., a corporation of Tennessee No Drawing. Application October 31, 1941, Serial No. 417,392

6 Claims. (Cl. 106—67)

Our invention relates to a ceramic insulating material, and more particularly to a method of forming such insulating material having comparatively high dielectric constant, high dielectric strength and good physical characteristics such as high mechanical strength and imperviousness to moisture, into intricate shapes.

A principal object of our invention is to provide a method by which a material which is non-plastic by nature is rendered plastic by our process and can thus be formed into intricate shapes and sizes required for the manufacture of ceramic capacitors and many other types of devices.

Another object of our invention is to provide a method by which a dielectric material having a high inductive capacitance which is not affected by moisture, temperature, or other atmospheric conditions, can be readily formed into the desired shapes and sizes.

Still another object of our invention is to provide a method of casting a material to thereby form articles which are abrasive-resistant and of such fine texture that they may be used for other purposes than electrical work, such other purposes including abrasive-resistant material as is required for guide members in textile processes such as spinning, weaving and knitting.

It has long been known that titanium dioxide possesses a very high dielectric constant, for instance, a ceramic material containing between ninety and ninety-five per cent of $TiO_2$ has a dielectric constant between eighty and ninety. Owing, however, to the lack of plasticity of titanium dioxide powder, it has been necessary in order to form ceramic condensers from titanium dioxide, to utilize with the titanium dioxide certain amounts of plastic clay or certain organic binders such as dextrine, sugar, wheat flour and the like. Titanium dioxide powder, when mixed with either plastic clay or organic binders, can be either dry pressed or extruded but such dry pressing or extrusion limits the form of the finished product to simple structures, generally of substantially uniform cross section. It has, therefore, been impossible heretofore to form from titanium dioxide, complex forms such as are essential for thread guides and the like in textile machinery and for electrical condensers as are now employed in a number of the electrical arts. It has long been recognized that complex forms of ceramic material can be produced by casting, but, so far as our knowledge goes, it has been considered impossible to produce from titanium dioxide powder a casting slip of sufficient plasticity and coherence and uniformity as to permit the use of this material in a casting process.

We have discovered, however, that it is possible to render titanium dioxide plastic by adding as deflocculants sodiumalginate or a mixture of sodiumalginate and montmorillonite, both of the substances being added in finely divided form and dispersed in water. If the correct proportions and procedure are used, it is possible, by combining either or both of these substances with non-plastic titanium dioxide powder to obtain a slip which is chemically neutral and where the finely divided titanium dioxide particles remain in suspension for a sufficient period to make slip castings in plaster of Paris or other absorptive molds possible.

The best known method and procedure which we have found to prepare a casting slip comprising a mixture of titanium dioxide and sodiumalginate or sodiumalginate and montmorillonite is as follows: Titanium dioxide either in the form of natural rutile crystals or as calcined precipated titanium dioxide is milled with water and sodiumalginate or sodiumalginate and montmorillonite for a sufficient length of time so that all particles will pass a 325-mesh sieve. We have found it preferable to pre-mill the sodiumalginate and montmorillonite before we add thereto the titanium dioxide.

The proportions of the material which have been found most suitable are as follows: (all parts by weight)

Montmorillonite _____ g__ 20
Colloidal suspension 3% by weight of
   sodiumalginate _____ ccm__ 55
Water _____ ccm__ 250–310

The colloidal suspension of sodiumalginate is made by dissolving three per cent sodiumalginate in water. The mixture as set forth above is ground in a pebble or ball mill for six hours and then there is added to the mixture approximately 890 g. of powdered titanium dioxide. The mixing or grinding is then continued for another period of approximately eight hours. Thereupon the mixture is removed from the ball mill and is then agitated by either a stirring or other suitable mixing machine for another period of approximately twenty-four hours. A slip for drain casting should have a specific gravity of 1.6 to 1.65 and for solid casting, the specific gravity of the slip should vary between 1.65 and 1.70. The specific gravity of the slip is, of course, adjusted by the water content of the slip.

After the slip is formed, it is poured into an absorptive mold such as a mold formed of plaster of Paris as is common in the ceramic industry and, after being allowed to set and harden, the pieces are removed from the mold, preferably in what might be termed in the ceramic industry, the leather dry state, in which there is approximately twelve to fifteen per cent moisture. In this condition, it is possible to join one or more of the cast pieces by "slipping," that is, by causing one part to slide or slip upon the other.

We have found that the cast pieces, after drying, have sufficient mechanical strength so as to be handled without breakage and, it will be of course understood, that after the pieces have reached the bone-dry state, that is, the state in which the moisture content is less than three per cent, they are placed in the furnace and fired to a temperature between seger cones 9 and 13. This firing causes a complete vitrification or crystallization of the titanium dioxide.

Having now described our invention, what we claim and desire to secure by Letters Patent is:

1. A casting slip comprising a mixture of titanium dioxide powder, sodiumalginate and montmorillonite, said mixture comprising substantially 90% titanium dioxide powder and 10% mixture of sodiumalginate and montmorillonite.

2. A casting slip comprising a mixture in water of titanium dioxide with a small amount of a deflocculating agent consisting of sodium alginate and montmorillonite.

3. A casting slip comprising an aqueous mixture of titanium dioxide to which mixture is added as a deflocculating agent 3% by weight of sodiumalginate.

4. A casting slip comprising an aqueous mixture of titanium dioxide to which mixture is added as a deflocculating agent less than 10% of sodium alginate and montmorillonite.

5. The method of preparing a casting slip of ceramic material largely composed of titanium dioxide, which consists in mixing a given amount of titanium dioxide powder with less than 10% by weight of montmorillonite and sodiumalginate, adding to the mixture approximately one-half by weight of water, grinding said mixture, and subsequently agitating the same.

6. The method of forming a casting slip of ceramic material composed largely of titanium dioxide, which consists in mixing an aqueous solution of sodiumalginate with powdered montmorillonite in the presence of excess water, grinding said mixture, and subsequently adding thereto approximately three times the weight of the mixture of titanium dioxide powder, grinding said mixture to a uniform density, and subsequently agitating the same.

HANS THURNAUER.
GEORGE WARREN FICHTER.